(12) United States Patent
Aurongzeb et al.

(10) Patent No.: US 12,405,841 B2
(45) Date of Patent: Sep. 2, 2025

(54) SYSTEM AND METHOD FOR LOAD-BALANCING PROCESSING REQUESTS ACROSS CLIENT INFORMATION HANDLING SYSTEMS TO MINIMIZE NOISE AND CARBON DIOXIDE EMISSIONS IN A DATA CENTER

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 505 days.

(21) Appl. No.: 17/969,472

(22) Filed: Oct. 19, 2022

(65) Prior Publication Data
US 2024/0134716 A1    Apr. 25, 2024
US 2024/0231953 A9    Jul. 11, 2024

(51) Int. Cl.
G06F 9/46    (2006.01)
G06F 9/50    (2006.01)

(52) U.S. Cl.
CPC .......... *G06F 9/5094* (2013.01); *G06F 9/5083* (2013.01); *G06F 2209/509* (2013.01)

(58) Field of Classification Search
CPC . G06F 9/5094; G06F 9/5083; G06F 2209/509
See application file for complete search history.

(56) References Cited

U.S. PATENT DOCUMENTS 8,185,909 B2    5/2012    Sigal
8,626,450 B2    1/2014    Dooley
(Continued)

FOREIGN PATENT DOCUMENTS

EP    2 006 770 B1    1/2014
WO    2011/106160 A2    9/2011

OTHER PUBLICATIONS

C. Herrmann, et al., "Sustainability as Strategic Business Model for Profitable Business," 6 pages, May 2014.
(Continued)

*Primary Examiner* — Diem K Cao
(74) *Attorney, Agent, or Firm* — Prol Intellectual Property Law, PLLC; H. Kenneth Prol

(57) ABSTRACT

A noise and carbon dioxide ($CO_2$) emissions minimizing load-balancing system executing on a unified endpoint management platform information handling system comprising a network interface device to receive telemetry measurements for a first server operating within peak hours, including power analytics, geographic location, ambient temperature and humidity, $CO_2$ emissions value, and measured noise level exceeding a first $CO_2$ load-balancing noise threshold value for the first server, a hardware processor to reject processing requests made to the first server above a $CO_2$ optimal request load predicted, via a neural network modeling a relationship between changes in $CO_2$ emissions values and changes in the telemetry measurements to cause the first server to emit noise below the first $CO_2$ load-balancing noise threshold value, and the hardware processor to redistribute rejected processing requests across candidate offload servers emitting noise below a candidate-specific $CO_2$ load-balancing noise threshold value determined for each of the candidate offload servers.

20 Claims, 4 Drawing Sheets

(56) References Cited

U.S. PATENT DOCUMENTS

| | | | |
|---|---|---|---|
| 9,183,327 | B2 | 11/2015 | Keeli |
| 9,760,474 | B2 | 9/2017 | Pillai |
| 2004/0024861 | A1 | 2/2004 | Coughlin |
| 2008/0046895 | A1 | 2/2008 | Dillenberger |
| 2009/0276388 | A1* | 11/2009 | Donohue ................ G06F 9/505 706/52 |
| 2009/0292617 | A1 | 11/2009 | Sperling |
| 2010/0070404 | A1 | 3/2010 | McConnell |
| 2014/0100937 | A1 | 4/2014 | Na |
| 2014/0181834 | A1 | 6/2014 | Lim |
| 2014/0316964 | A1 | 10/2014 | Slutsker |
| 2016/0028649 | A1* | 1/2016 | Herington ............ H04L 47/783 709/226 |
| 2017/0123857 | A1 | 5/2017 | Khan |
| 2021/0004328 | A1 | 1/2021 | Wang |
| 2022/0358515 | A1* | 11/2022 | Kahn ...................... G06F 30/27 |
| 2023/0418688 | A1* | 12/2023 | Wang ................... G06F 9/5094 |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

\* cited by examiner

SYSTEM AND METHOD FOR LOAD-BALANCING PROCESSING REQUESTS ACROSS CLIENT INFORMATION HANDLING SYSTEMS TO MINIMIZE NOISE AND CARBON DIOXIDE EMISSIONS IN A DATA CENTER

FIELD OF THE DISCLOSURE

The present disclosure generally relates to minimizing an amount of greenhouse gas emissions that may be attributable to operation of an information handling system. More specifically, the present disclosure relates to a noise and carbon dioxide ($CO_2$) emissions minimizing load balancing system for balancing processing requests across a plurality of client information handling systems within an enterprise system, such as a data center, based on noise detection, to minimize that noise and $CO_2$ emissions due to operation of such client information handling systems.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
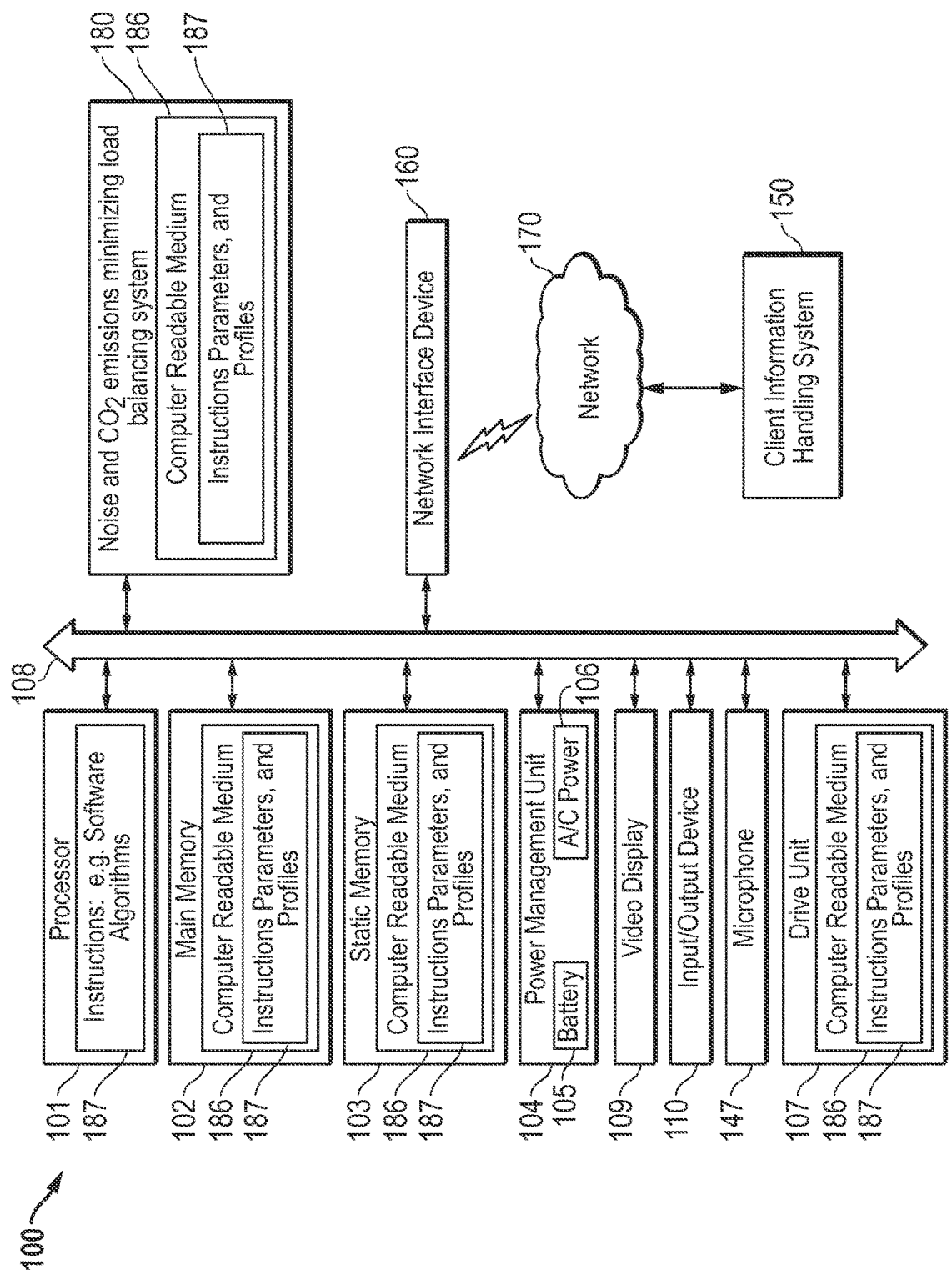
FIG. 1 is a block diagram illustrating a cloud-based Unified Endpoint Management (UEM) platform information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Load-balancing of processing requests across enterprise systems comprising a plurality of client information handling systems or servers is essential to efficient operation of server farms, or data centers for cloud computing providers and customers. Enterprise systems often access a large number of client information handling systems in various locations within one or more geographic regions (e.g., within the United States, Europe, the Europe, Middle East, Africa (EMEA) region, or globally). Many systems exist for optimizing distribution of processing requests across a plurality of such client information handling systems located in various places for data centers around the world in order to maximize the speed, efficiency, or throughput (e.g., number of calls processed within a set period of time) of the overall enterprise system or across all participating client information handling systems. However, a system for distributing such processing requests so as to minimize carbon dioxide ($CO_2$) or other greenhouse gas (GHG) emissions is needed.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. Further, such emissions may also influence a cloud computing customer's selection of cloud-based computing resources, including client information handling systems such as servers operated within one or more data centers for a larger enterprise system. GHGs emitted by any given client information handling system (e.g., server) within an enterprise network may be dependent upon power consumed during operation of the client information handling system, and geographic location of the client information handling system. For example, client information handling systems may cause the emission of GHGs by consuming power delivered by power stations that burn fossil fuels, or capture more environmentally friendly solar, wind, or water power. The type of power plant providing such power for consumption by the client information handling system, and consequently, the GHGs emitted during consumption of power may depend upon the geographic location at which such power is consumed. The amount of GHGs emitted during production of each kilowatt-hour (kWh) of power may vary greatly across different geographic regions. For example, on average, power plants within India may emit 1.82 pounds of carbon dioxide ($CO_2$) per kWh of power delivered, while power plants within France may emit 0.136 pounds of $CO_2$ (e.g., one-tenth that of India) per kWh of power delivered.

The noise and $CO_2$ emissions minimizing load balancing system in embodiments of the present disclosure address this issue by determining an optimal distribution of processing requests across a plurality of client information handling systems located at various places around the planet so as to minimize $CO_2$ emissions. Such a load-balancing method may be triggered in various embodiments described herein based on detected noise generated at each client information handling system during operation of active cooling of the system, indicating that the processor may be heating up due to a high processing request load during peak operating hours. For each client information handling system, the noise and $CO_2$ emissions minimizing load balancing system may determine such peak operating hours based on the percentage of all daily processing requests processed within any given hour. For example, in any given hour of a 24-hour period in which a client information handling systems processes more than a threshold value (e.g., 10%) of the total number of processing requests received by that client information handling system within a 24-hour period, the client information handling system may be said to be operating within "peak hours." Further, the noise and $CO_2$ emissions minimizing load balancing system may determine a $CO_2$ emissions value for each client information handling system during each of these peak hours recorded during a training period (e.g., within the first thirty days after initial use of the client information handling system). The $CO_2$ emissions value may be correlated to noise volume and duration levels detected via microphone at each client information handling system. The noise and $CO_2$ emissions minimizing load balancing system may take an average of each of these determined $CO_2$ emissions values or corresponding noise level value of volume and duration to set a maximum $CO_2$ emissions value that the noise and $CO_2$ emissions minimizing load balancing system allows each client information handling system to emit by capping the number of processing requests routed to each client information handling system during its peak hours.

The noise emitted by each client information handling system in embodiments described herein may serve as a proxy indicator of the power being consumed by each client information handling system, and thus, the $CO_2$ emitted during operation. A neural network located at a Unified Endpoint Management (UEM) platform servicing or managing each of the client information handling systems within an enterprise system may be trained to model a relationship between various operational telemetry measurements describing operation of the client information handling system and determined $CO_2$ emissions values for that system. Such operational telemetry measurements in various embodiments described herein may include, for example, power analytics including power consumption, microphone-recorded noise levels (e.g., in decibels (dB) and duration of noise at various dB levels), geographic location, and ambient temperature and humidity at such a geographic location. Upon determination of the maximum $CO_2$ emissions value that the noise and $CO_2$ emissions minimizing load balancing system allows an individual client information handling system to emit, as described directly above, the neural network may predict a $CO_2$ load-balancing noise threshold value such a client information handling system may emit when also emitting the maximum $CO_2$ emissions value. In such a way, the noise and $CO_2$ emissions minimizing load balancing system may define a noise level each client information handling system may emit before triggering a capping limitation instruction of processing requests at that client information handling system in order to minimize $CO_2$ emissions.

The noise and $CO_2$ emissions minimizing load balancing system in embodiments of the present disclosure may also reroute or redistribute any processing requests rejected by a first client information handling system pursuant to such capping limitation instruction of requests at the first client information handling system so as to further minimize $CO_2$ emissions. For example, the noise and $CO_2$ emissions minimizing load balancing system in embodiments may prioritize redistribution of rejected processing requests to other client information handling systems within the enterprise likely to emit less $CO_2$ during processing of such requests. More specifically, such rejected requests may be redistributed to prioritize client information handling systems currently operating in off-peak hours, currently emitting lower noise levels (e.g., indicating slower fan speed, fewer active cooling fans, and lower processor temperature and power consumption), or located in a geographic region that emits less $CO_2$ per kWh of power generated than that of the geographic location for the first client information handling system. In such a way, the noise and $CO_2$ emissions minimizing load balancing system optimally distribute processing requests across a plurality of client information handling systems located at various places around the planet so as to minimize $CO_2$ emissions.

FIG. 1 illustrates an information handling system 100 according to several aspects of the present disclosure. As described herein, an information handling system 180 may execute code instructions of a noise and $CO_2$ emissions minimizing load-balancing system 180 operating at a Unified Endpoint Management (UEM) platform information handling system to optimally distribute processing requests across a plurality of client information handling systems (e.g., 150) at various geographic locations within an enterprise system managed at the UEM platform so as to minimize $CO_2$ emitted during processing of such requests across all client information handling systems (e.g., 150) of the enterprise system. Such a $CO_2$ optimized load-balancing method may be triggered upon a client information handling system (e.g., 150) emitting noise at a level reaching or exceeding a $CO_2$ load-balancing noise threshold value specific to that client information handling system (e.g., 150) and indicating that the client information handling system (e.g., 150) is currently causing $CO_2$ emissions exceeding a maximum threshold value due to processor load, ambient temperature, ambient humidity, or geographic location of the client information handling system (e.g., 150). Some or all of portions and components information handling system 100 in FIG. 1 may also represent one or more client device information handling systems according to embodiments herein, also shown at client information handling system 150 when information handling system 100 serves as a UEM platform. Client device operational telemetry measurements including power analytics, a load of remote processing calls made to a hardware processor, noise measurements, geographic location, ambient temperature or humidity for that geographic location (e.g., as retrieved from a weather database), as well as determined $CO_2$ emissions values particular to each client information handling systems (e.g., 150) may be gathered during routine monitoring periods from a plurality of client information handling systems (e.g., 150) at the UEM platform 100 executing the noise and $CO_2$ emissions minimizing load-balancing system 180. Some or all of the information handling system 100 of FIG. 1 may operate at a UEM platform information handling system or as a client information handling system according to various embodiments herein.

Using these crowd-sourced operational telemetry measurements from a plurality of client information handling systems (e.g., 150), and $CO_2$ emissions values, the noise and $CO_2$ emissions minimizing load-balancing system 180 executing on a hardware processor 101 in embodiments herein may use a crowd-source trained feed-forward neural network modelling a relationship between changes in $CO_2$ emissions values and changes in client device operational telemetry measurements to predict, for each of the plurality of client information handling systems (e.g., 150), a noise level that will be detected by a microphone 147 at that client information handling system (e.g., 150) when that client information handling system (e.g., 150) is also emitting $CO_2$ at or above a maximum $CO_2$ threshold value specific to that client information handling system (e.g., 150). Because the noise generated by the client information handling system 150 may peak during processing of the highest request load, or in combination with high ambient temperature or high humidity due to increased fan speeds, a greater number of active cooling fans used, or other data center cooling systems operating, the noise and $CO_2$ emissions minimizing load balancing system 180 may correlate measured noise with a maximum allowable $CO_2$ threshold value to provide a $CO_2$ load-balancing noise threshold value at which a load-balancing method may be triggered at each client information handling system (e.g., 150). Upon detecting that the client information handling system 150 has reached the $CO_2$ load-balancing noise threshold value, the noise and $CO_2$ emissions minimizing load-balancing system 180 trained neural network operating at the UEM platform 100 in an embodiment may then generate and send an instruction to cap processing requests accepted by the client information handling system 150 and redistribute any processing requests rejected by the client information handling system 150 across one or more client information handling systems currently emitting less $CO_2$ than the client information handling system 150.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the noise and $CO_2$ emissions minimizing load-balancing system 180, the wireless network interface device 160, a static memory 103 or drive unit 107, a, a video display 109, microphone 147, or other components of an information handling system. The video display 109 in an embodiment may function as a liquid crystal display (LCD), an organic light emitting diode (OLED), a flat panel display, or a solid-state display. The microphone 147 may operate at one or more client information handling systems (e.g., 150) to detect noise levels generated due to cooling mechanisms such as fans at those client information handling systems, which may operate as servers within a data center, for example. The information handling system 100 may also include one or more buses (e.g., 108) operable to transmit communications between the various hardware components.

The information handling system 100 may execute code instructions 187, via one or more hardware processing resources, such as for the noise and $CO_2$ emissions minimizing load-balancing system 180, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing a noise and $CO_2$ emissions minimizing load-balancing system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11a/h/j/n/ac/ax including Wi-Fi 6 and Wi-Fi 6*e*. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to optimally distribute processing requests across a plurality of client information handling systems at various geographic locations so as to minimize CO2 emitted during processing of such requests across all client information handling systems. For example, instructions 187 may include a particular example of a noise and CO2 emissions minimizing load-balancing system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The noise and CO2 emissions minimizing load-balancing system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the noise and CO2 emissions minimizing load-balancing system 180, firmware or software algorithms, processes, and/or methods may be stored here. Such code instructions 187 may comprise capping processing requests accepted at a first client information handling system 150 at which a CO2 load-balancing noise threshold value has been met by ambient recorded noise at that client information handling system 150 and rerouting all rejected processing calls to other client information handling systems currently emitting less CO2 than the first client information handling system 150. The noise and CO2 emissions minimizing load-balancing system 180 may operate on hardware processing resources within a Unified Endpoint Management (UEM) platform 100 that gathers telemetries from a plurality of client information handling systems (e.g., 150) endpoints via the network 170 that describe operating environments for those client information handling systems (e.g., 150). The UEM platform 100 in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the noise and CO2 emissions minimizing load-balancing system 180 may be stored in static memory 103, or the drive unit 107 on a computer-readable medium 186 such as a flash memory or magnetic disk in an example embodiment. More specifically, telemetries describing noise measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® Core class hardware processor, ARM @brand hardware processors, Qualcomm® Snapdragon hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 150 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
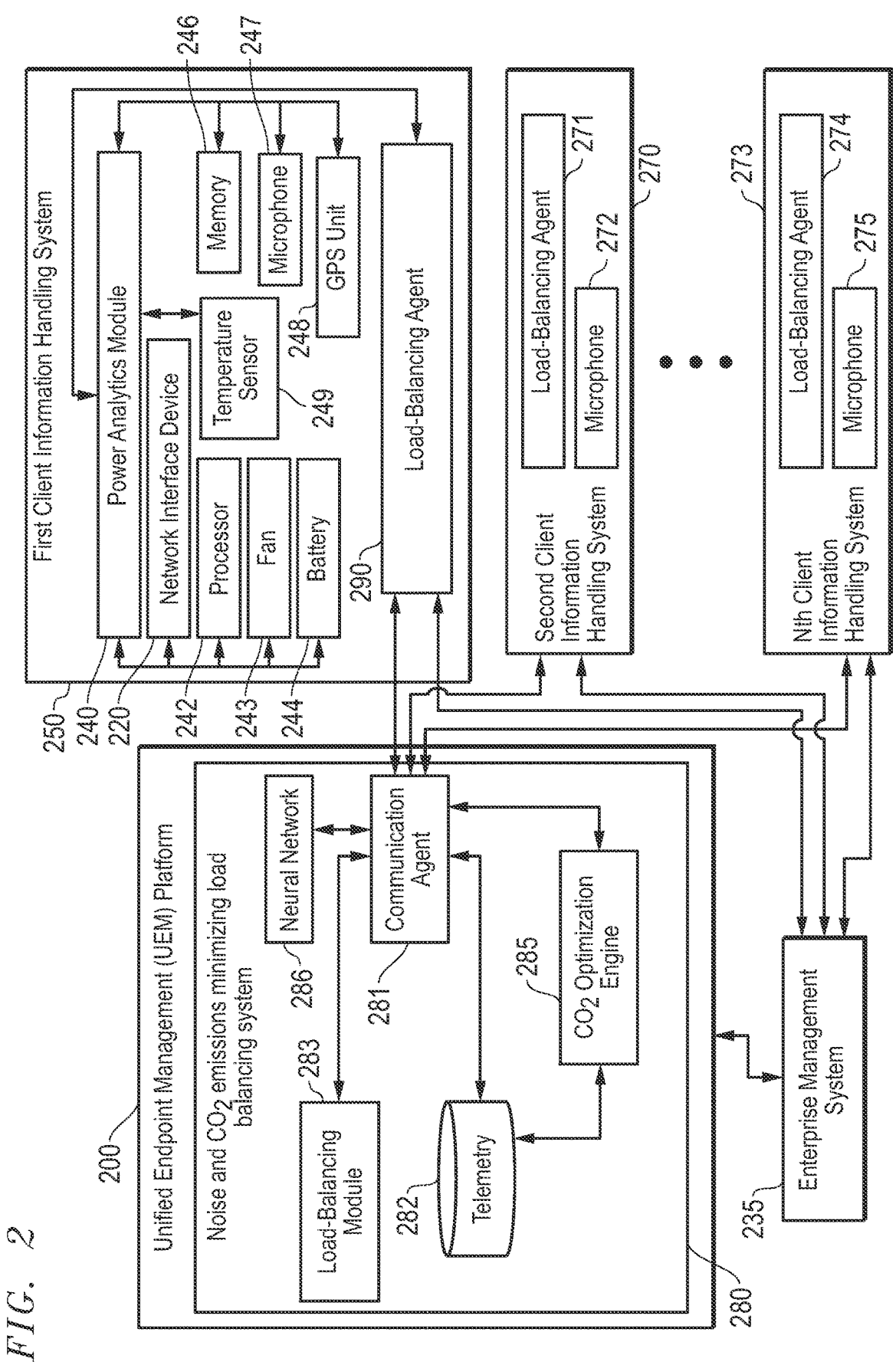
FIG. 2 is a block diagram illustrating a noise and carbon dioxide ($CO_2$) emissions minimizing load-balancing system executing on a UEM information handling system with plural client information handling systems according to an embodiment of the present disclosure.

FIG. 2 is a block diagram illustrating a noise and carbon dioxide (CO2) emissions minimizing load-balancing system 280 for optimally distributing processing requests across a plurality of client information handling systems (e.g., 250, 270, and 273), which may operate as servers, at various geographic locations so as to minimize CO2 emitted during processing of such requests. Such a CO2 optimized load-balancing method may be triggered upon a client information handling system 250 or its surroundings emitting noise at a level reaching or exceeding a CO2 load-balancing noise threshold value specific to that client information handling system 250 and indicating that the client information handling system 250 is currently causing CO2 emissions exceeding a maximum threshold value due to processor load, ambient temperature, ambient humidity, or geographic location of the client information handling system 250.

A unified endpoint management (UEM) platform 200 in an embodiment may execute a noise and CO2 emissions minimizing load-balancing system 280 to predict, for each of the plurality of client information handling systems (e.g., 250, 270, and 273), a noise level that will be emitted at that client information handling system (e.g., 250, 270, or 273) when that client information handling system (e.g., 250, 270, or 273) is also emitting CO2 at or above a maximum CO2 threshold value specific to that client information handling system (e.g., 250, 270, or 273). Such a prediction may be made using a trained neural network 286 modelling a relationship between changes in CO2 emissions values and changes in client device operational telemetry measurements gathered at the UEM platform 200 over a training period and over a plurality of load-balancing monitoring periods following such a training period. Client device operational telemetry measurements including power analytics, noise measurements, a load of remote processing calls made to a hardware processor, geographic location, ambient temperature or humidity for that geographic location (e.g., as retrieved from a weather database), as well as determined $CO_2$ emissions values particular to each client information handling systems (e.g., 250, 270, or 273) may be gathered during routine monitoring periods from a plurality of client information handling systems (e.g., 250, 270, or 273) at the UEM platform 200 executing the noise and $CO_2$ emissions minimizing load-balancing system 280. Each of a plurality of client information handling systems (e.g., 250, 270, and 273) may be under management of or in communication with an enterprise management system 235, which may act as an interface between the client information handling system (e.g., 250, 270, or 273) and the UEM platform 200. The UEM platform 200 executing code instructions of the noise and $CO_2$ emissions minimizing load-balancing system 280 may correlate measured noise at each client information handling system (e.g., 250, 270, or 273) with a maximum allowable $CO_2$ threshold value to provide a $CO_2$ load-balancing noise threshold value at which a load-balancing method may be triggered at each client information handling system (e.g., 250, 270, or 273). Upon detecting that the client information handling system (e.g., 250) has reached the $CO_2$ load-balancing noise threshold value for that system (e.g., 250), the noise and $CO_2$ emissions minimizing load-balancing system 280 operating at the UEM platform 200 in an embodiment may then cap processing requests accepted by the client information handling system 250 and redistribute any processing requests rejected by the client information handling system 250 across one or more client information handling systems (e.g., 270, or 273) currently emitting less $CO_2$ than the client information handling system 250.

The UEM platform 200 in an embodiment may operate as a cloud-based service in communication with the enterprise management system 235 via a network to identify information technology (IT) issues at a first client information handling system 250, a second client information handling system 270, or a plurality of other client information handling systems within say, a data center, up to an Nth client information handling system 273. Each of the client information handling systems (e.g., 250, 270, and 273) may also include, at least a load-balancing agent (290, 271, or 274, respectively) and a microphone (e.g., 247, 272, or 275, respectively). The UEM platform 200 and enterprise management system 235 may also provide support for such issues, including automatically updating drivers or hardware components, as needed. In a specific embodiment of the present disclosure, the UEM platform 200 may gather operational telemetry measurements from a plurality of client information handling systems (e.g., 250, 270, and 273) that describe operating environments for those client information handling systems (e.g., geographic location, power consumption analytics, recorded noise levels, or analytics for software usage) at one or more data centers.

A noise and $CO_2$ emissions minimizing load-balancing system 280 in an embodiment may use a crowd-source trained neural network 286 that models a relationship between changes in $CO_2$ emissions values and changes in various operational telemetry measurements, including recorded noise levels and ambient temperature or humidity for the measured geographic location of the client information handling system (e.g., 250, 270, or 273). For example, client information handling system operational telemetry measurements such as geographic location, power analytics, and noise measurements may be used to predict the degree to which certain changes in noise recorded at each client information handling system (e.g., 250, 270, or 273) may increase $CO_2$ emitted during execution of processing requests at a given measured load (e.g., calls per second). Because noise generated by client information handling systems (e.g., 250, 270, or 273, which may be operating as servers) peaks during processing of a highest request load, the neural network 286 may correlate a measured noise level (e.g., in decibels (dB)) for each client information handling system (e.g., 250, 270, or 273) with $CO_2$ emissions values determined for each client information handling systems (e.g., 250, 270, or 273). The neural network 286 may then predict a $CO_2$ load-balancing noise threshold value at which each client information handling system (e.g., 250, 270, or 273) may emit noise while also generating a determined $CO_2$ emissions value meeting a maximum allowable threshold value. This maximum allowable threshold value in embodiments may also be determined for each client information handling system (e.g., 250, 270, and 273), based on determined $CO_2$ emissions values determined for that client information handling system (e.g., 250) during peak hours of operation within a training period (e.g., 30 days) following initial use of that client information handling system (e.g., 250). The UEM platform 200 may receive operational telemetry measurements upon which such predicted and later determined $CO_2$ load-balancing noise threshold value and $CO_2$ emissions levels may be made from a plurality of client information handling systems (e.g., 250, 270, and 273). The plurality of client information handling systems (e.g., 250, 270, and 273) may be managed by the same enterprise management system (e.g., 235), or may be managed by separate enterprise management systems in various embodiments.

Each client information handling system (e.g., 250, 270, or 273) in an embodiment may include a plurality of hardware components. For example, a first client information handling system 250 in an embodiment may include a network interface device 220, a hardware processor (e.g., central processing unit (CPU), graphics processing unit (GPU), or visual processing unit (VPU)) 242, a memory 246, a fan 243, and one or more components of a power supply unit (e.g., battery 244). In some embodiments, the first client information handling system 250 may further include one or more sensing devices, such as a microphone 247 for detecting ambient noise levels at the client information handling system 250 (e.g., in dB), location sensing devices 248 (e.g., GPS location unit), or temperature sensor 249, for example. In another embodiment, the first client information handling system 250 may further be operably connected to one or more peripheral devices, for example. Such an operably connection may employ a driver or firmware for such a peripheral device in such an embodiment. One or more of the other hardware components described herein (e.g., 220, 242, 243, 244, 246, 247, 248, or 249) may further operate according to firmware or driver instructions in an embodiment.

A power analytics module 240 in an embodiment may be in communication with the various hardware components (e.g., 220, 242, 243, 244, 246, 247, 248, or 249) and firmware for those components in an embodiment. For example, the power analytics module 240 may monitor power consumption by each of the various hardware components (e.g., 220, 242, 243, 244, 246, 247, 248, or 249) in an embodiment. In another example embodiment, the power analytics module 240 may also access firmware for hardware components (e.g., 220, 242, 243, 244, 246, 247, 248, or 249) to determine policies or settings for those components at the time of such power measurements. The power analytics module 240, along with the load-balancing agent 290 may also receive load-balancing user instructions to cap a number of processing resources made available for remote processing requests received from remote client information handling systems via the network interface device 220 or to reroute received processing requests exceeding such a cap to other client information handling systems (e.g., 270, or 273) also managed by the enterprise management system 235 at one or more data centers.

More specifically, the power analytics module 240 in an embodiment may determine current usage as a percentage of total capacity for the hardware processor 242 (e.g., central processing unit (CPU), graphics processing unit (GPU), or visual processing unit (VPU)). In another example, the power analytics module 240 may determine a remote processing request load (e.g., in calls processed per second, minute, or hour) for requests received from remote devices (e.g., via network interface device 220) to perform processing calls via processor 242. In still another example, the power analytics module may determine current usage as a percentage of total capacity for memory 246, time required to process requests to access such memory 246, and identify software applications most frequently accessing such memory 246. All information accessed in such a way by the power analytics module 240 in an embodiment may be communicated to a data collector 261.

The power analytics module 240 in an embodiment may also be capable of assessing and adjusting such policies within firmware for one or more hardware components, upon user approval. For example, the power analytics module 240, along with the load-balancing agent 290 may also cap a number of processing resources made available for remote processing requests received from remote client information handling systems via the network interface device 220 or reroute received processing requests exceeding such a cap to other client information handling systems (e.g., 270, or 273) also managed by the enterprise management system 235.

The data collector 261 may routinely collect information from the power analytics module 240 at preset intervals, or may do so upon notification by the power analytics module 240 of a specific event, failure, or warning. Information recorded by the power analytics module 240 may be output into reports. The format of such a report may vary, which may require reformatting of such information into an easily classified, sorted, and searchable format. Thus, the data collector 261 in an embodiment may operate to reformat any received reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240 and reformatted to a predetermined data interchange format (e.g., JSON) to a load-balancing agent 290. Such a JSON-formatted report may be referred to herein as a JSON event. Each JSON event may include any information gathered from the power analytics module 240 and a time stamp associated with either the time the analytics module report was generated, or the time at which any given measurement within the report was made. In some cases, a JSON event may include a single notification or warning from an analytics module (e.g., microphone 237 recording ambient noise above a threshold value). In other cases, a JSON event may include routinely gathered information such as current configurations or policies for various hardware components (e.g., 220, 242, 243, 244, 246, 247, 248, or 249), power consumption of those components over a known monitoring time period, geographic location, or ambient temperature or humidity for that geographic location. In some cases, the ambient temperature or humidity for that geographic location may be drawn from a database recording such values for a plurality of geographic locations around the world. One or more of such JSON events may be combined into a single JSON incident in various embodiments described herein.

As described herein, the UEM platform 200 in an embodiment may gather JSON incidents, like the one described directly above, routinely from a plurality of client information handling systems operating under different environmental conditions and usage patterns. These JSON incidents may first be gathered during a training period during which a neural network 286 may be trained to model a relationship between changes in various operational telemetry measurements within such JSON incidents including noise levels detected, temperature, humidity, and other ambient measurements and changes in a determined $CO_2$ emissions value for the client information handling system (e.g., 250). Immediately following such a training period, the noise and $CO_2$ emissions minimizing load balancing system 280 in an embodiment may identify peak hours of operation for the client information handling system (e.g., 250) as the hours in which the JSON incidents received during the training period reflect the remote processing request load on the processor 242 during any given hour of a 24-hour period reaching a peak hour threshold percentage of total remote processing request load for that 24-hour period. For example, the noise and $CO_2$ emissions minimizing load balancing system 280 in an embodiment may identify each hour within a given 24-hour period in which the remote processing request load on the processor 242 met or exceeded 10% of the total remote processing request load received for that 24-hour period as a peak hour. This is only one example of a peak hour threshold percentage (e.g., 10%), and other embodiments contemplate any percentage of the total remote processing request load for a 24-hour period below 100% and above zero.

The noise and $CO_2$ emissions minimizing load balancing system 280 in an embodiment may also refer to JSON incidents gathered during such a training period to determine the $CO_2$ emissions values recorded during such identified peak hours for each client information handling system (e.g., 250, 270, or 273). As described herein, $CO_2$ emitted by any given client information handling system (e.g., 250, 270, or 273) within an enterprise network may be dependent upon power consumed during operation of the client information handling system (e.g., 250, 270, or 273), and geographic location (e.g., India or France, respectively) of the client information handling system (e.g., 250, 270, or 273). For example, client information handling systems (e.g., 250, 270, or 273) may cause the emission of $CO_2$ by consuming power delivered by power stations that burn fossil fuels, or capture more environmentally friendly solar, wind, or water power. The type of power plant providing such power for consumption by the client information handling system (e.g., 250, 270, or 273), and consequently, the CO2 emitted during consumption of power may depend upon the geographic location (e.g., India, or France, respectively) at which such power is consumed.

The amount of CO2 emitted during production of each kilowatt-hour (kWh) of power may vary greatly across different geographic regions. For example, on average, power plants within India, where the first client information handling system 250 may be operating, may emit 1.82 pounds CO2 per kWh of power delivered. In contrast, power plants within France, where the second client information handling system 270 may be operating, may emit 0.136 pounds of CO2 per kWh of power delivered. In such a scenario, the first client information handling system 250 may cause more than ten times as much CO2 emissions than the second client information handling system 270 by drawing the same amount of power consumed at the second client information handling system 270. The CO2 optimization engine 285 in an embodiment may transmit these location-specific CO2 emissions per kWh consumed for the geographic location of the client information handling system (e.g., 250, 270, or 273) to each of the client information handling systems (e.g., 250, 270, or 273). The load-balancing agent 290 in an embodiment may multiply these received location-specific CO2 emissions per kWh by the power consumed over a set period of time to determine a CO2 emissions value for each JSON incident generated by each client information handling system. The load-balancing agent 290 may further include such determined CO2 emissions values within each JSON incident prior to transmission of the JSON incidents to the communication agent 281.

Following determination of the peak hours for a client information handling system (e.g., 250, 270, or 273), and receipt of a determined CO2 emissions value for each of those peak hours during the training period in an embodiment, the noise and CO2 emissions minimizing load balancing system 280 may determine, for each client information handling system individually (e.g., 250, 270, and 273 individually) an average amount of CO2 emitted during its peak hours. This average amount of CO2 emitted during peak hours of a training period may be used as a target maximum CO2 emissions value for future operation of each client information handling system. Because such a training period may occur immediately after initial use of the client information handling system (e.g., 250, 270, or 273), and because power consumption efficiency may decrease as each client information handling system (e.g., 250, 270, or 273) ages, the CO2 emitted during peak hours of the training period may indicate the CO2 emitted while the each client information handling system is operating at peak efficiency with respect to its life cycle. As these client information handling systems (e.g., 250) age and consume a greater amount of power to perform the same number of processing calls, it may become appropriate to offload some of these processing calls to other, more power-efficient client information handling systems (e.g., 270, or 273). In other aspects, some client information handling systems may experience decreased power-efficiency due to ambient temperature or humidity, rather than age. For example, as the ambient temperature or humidity surrounding a client information handling system (e.g., 250) increases, the cooling system (e.g., fan 243) may consume greater amounts of power to keep the processor 242 operating efficiently and effectively. In such a scenario, it may also be appropriate to offload some processing calls made to the processor 242 to other, more power-efficient client information handling systems (e.g., 270, or 273), which may be operating in cooler climates.

As described herein, the noise emitted by each client information handling system (e.g., 250, 270, or 273) in an embodiment may serve as a proxy indicator of the power being consumed by each client information handling system, and thus, the CO2 emitted during operation. This may be the case, for example, because the temperature of the processor 242 may increase as the load of remote processing calls to that processor 242 increases, thus triggering the fan 243 to engage and generate noise. This may also be the case, for example, when the fan 243 is engaged to offset an increase in ambient temperature or humidity in order to preserve efficiency and effectiveness of the processor 242. Other causes for an increase in measured noise levels may include an increased number of fans actively engaged, or an increase in the speed at which such fans rotate. Still other causes for such an increase in measured noise levels may also include an increase in ambient noise at a data center due to other client nearby client information handling systems engaging their fans to decrease heat generated at those devices or data center general cooling systems activating at a data center facility. In each of these cases, the power consumed by the client information handling system 250 may increase due to use of the fan 243 to cool the processor 242. Thus, noise generated by the fan 243 in an embodiment may correlate to increases in power consumption at the client information handling system 250.

As described above, the neural network 286 may be trained to model a relationship between changes various operational telemetry measurements, including noise levels measured by microphone 247, and determined CO2 emissions values for a client information handling system 250. Upon determination of the maximum CO2 emissions value that the noise and CO2 emissions minimizing load balancing system allows an individual client information handling system 250 to emit, as described directly above, the neural network may predict a CO2 load-balancing noise threshold value for such a corresponding detected noise level that a client information handling system 250 may emit when also emitting the maximum CO2 emissions value. In such a way, the noise and CO2 emissions minimizing load balancing system may define a noise level detected at each client information handling system (e.g., 250) may emit at which it may become appropriate to offload some processing calls made to the processor 242 to other, more power-efficient client information handling systems (e.g., 270, or 273), which may be operating in cooler climates. The noise and CO2 emissions minimizing load balancing system 280 may transmit such CO2 load-balancing noise threshold values and determined peak hours of operation to each client information handling system (e.g., 250, 270, or 273) for which such a determination has been made. For example, the CO2 load-balancing noise threshold value and peak hours of operation for client information handling system 250 may be transmitted to the load-balancing agent 290 via communication agent 281.

Each client information handling system (e.g., 250, 270, or 273) in an embodiment may then enter routine load-balancing monitoring intervals in which JSON incidents continue to be generated and transmitted to the noise and CO2 emissions minimizing load balancing system 280. Because transmission of such monitoring period JSON incidents is intended to determine when client information handling systems are exceeding the maximum CO2 emissions value allowed during peak hours of operation, only JSON incidents recorded during such identified peak hours may be transmitted to the UEM platform 200 in an embodiment. The load balancing agent (e.g., 290 or 271) operating at each client information handling system (e.g., 250, 270, or 273) may generate and transmit to the UEM platform 200 such monitoring JSON incidents to include all previously described operational telemetry measurements (e.g., power analytics and consumption, geographic location, remote processing request load, noise measurements, ambient temperature or humidity for the recorded geographic location, and determined $CO_2$ emissions values), as well as the $CO_2$ load-balancing noise threshold value for each specific client information handling system (e.g., 250, 270, or 273). In an embodiment in which such a monitoring period JSON incident includes a noise measurement identified by the noise and $CO_2$ emissions minimizing load balancing system 280 as meeting the $CO_2$ load-balancing noise threshold value also included within the received JSON incident, the noise and $CO_2$ emissions minimizing load balancing system may notify the load-balancing module 283. In an embodiment, the load-balancing module 283 may identify one or more other client information handling systems (e.g., 270, or 273) also managed by the enterprise management system 235 as candidates to receive a portion of the remote processing calls currently being routed to the first client information handling system 250. The load-balancing module 283 may operate to determine an optimal method for redistributing a portion of those remote processing calls currently routed to the first client information handling system 250 across such other client information handling systems (e.g., including 270).

The load-balancing module 283 may identify one or more candidate offload client information handling systems (e.g., 270, or 273) that may be capable of handling a portion of the current request load for the first client information handling system 250 while minimizing $CO_2$ emissions based on one or more of a plurality of $CO_2$-sensitive factors. For example, candidate offload client information handling systems (e.g., 270, or 273) may include client information handling systems currently operating outside peak hours of operation, or at measured noise levels below the $CO_2$ load-balancing noise threshold value individually identified or determined for that specific client information handling system (e.g., 270, or 273). Upon identification of all candidate offload client information handling systems (e.g., including 270), the load-balancing module 283 may use the neural network 286 to determine, for each candidate offload client information handling system, a $CO_2$ optimal request load that would cause the system to generate noise falling below the $CO_2$ load-balancing noise threshold value individually determined for that specific client information handling system (e.g., including 270). A $CO_2$ emissions offload capability may be determined for each of these candidate offload client information handling systems (e.g., including 270) by determining the difference between the $CO_2$ optimal request load and the current remote processing request load for that client information handling system (e.g., 270, or 273) as recorded within the most recently received JSON incident from that client information handling system (e.g., 270, or 273). Based on this $CO_2$ emissions offload capability determined for each of the candidate offload client information handling systems (e.g., including 270) in an embodiment, the load-balancing module 283 may determine a percentage of the current remote processing request load for the first client information handling system 250 that may be rerouted to each of the candidate offload client information handling systems to minimize $CO_2$ emissions across all client information handling systems (e.g., including 250, 270, and 273) managed by the enterprise management system 235.

The load-balancing module 283 may transmit a capping instruction to the load-balancing agent 290 to cap the number of remote processing calls to the processor 242 for client information handling system 250 at the remote processing call load identified within JSON incident received immediately prior to the most recently received JSON incident. The load-balancing agent 290 in such an embodiment may work in tandem with the power analytics module 240 to cap the resources for the processor 242 for client information handling system 250 may available pursuant to execution of such received remote processor calls. In such a way, the load-balancing agent 290 and power analytics module 240 may limit the number of remote calls to the processor 242 to a number of calls recorded just prior to the microphone 247 detecting and recording within the most recent JSON incident ambient noise exceeding the $CO_2$ load-balancing noise threshold value for client information handling system 250.

In an embodiment, the load-balancing module 283 may also orchestrate rerouting or redistribution any processing requests rejected by the first client information handling system 250 pursuant to such capping of requests at the first client information handling system 250 so as to further minimize $CO_2$ emissions. The load-balancing module 283 may follow any currently known or future developed methods of load-balancing, as informed by the determined $CO_2$ emissions values for each of the candidate offload client information handling systems (e.g., including 270) to perform such a process in an embodiment. For example, the noise and $CO_2$ emissions minimizing load balancing system 280 and load-balancing module 283 in an embodiment may prioritize redistribution of rejected processing requests (up to the determined $CO_2$ emissions offload capability for that candidate) to candidate offload client information handling systems (e.g., including 270) predicted by the neural network 286 to emit less $CO_2$ during processing of such requests. More specifically, such rejected requests may be redistributed to prioritize client information handling systems (e.g., 270, or 273) currently operating in off-peak hours, or currently emitting lowest noise levels or fewer fans activated measured across all candidate offload client information handling systems (e.g., indicating slower fan speed and lower processor temperature and power consumption). Thus, those candidate offload client information handling systems may have higher noise levels, but their power sources may be cleaner. In another example, such rejected requests may be redistributed to prioritize client information handling systems (e.g., 270, or 273) located in a geographic region that emits less $CO_2$ per kWh of power generated than that of the geographic location for the first client information handling system or other candidate offload client information handling systems. In yet another example, such rejected requests may be redistributed to prioritize client information handling systems (e.g., 270, or 273) currently operating at geographic locations associated with lowest temperature or humidity measured across all candidate offload client information handling systems. In such a way, the noise and $CO_2$ emissions minimizing load balancing system optimally distribute processing requests across a plurality of client information handling systems located at various places or data centers around the planet so as to minimize $CO_2$ emissions.

Figure 3:
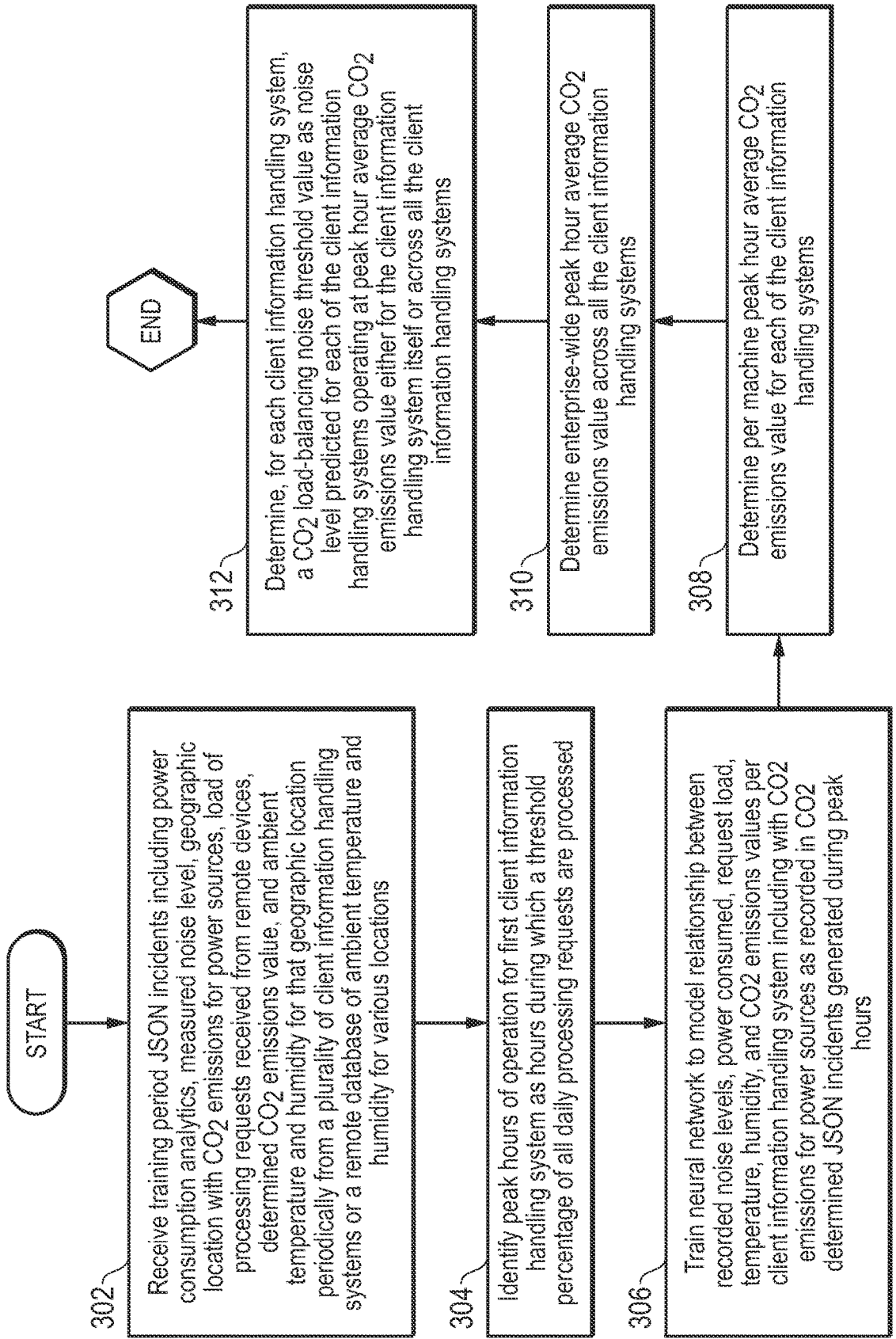
FIG. 3 is a flow diagram illustrating a method of training and using a neural network to determine a $CO_2$ load-balancing noise threshold value for triggering load-balancing to minimize $CO_2$ emissions based on detected noise levels at a client information handling system according to an embodiment of the present disclosure.

FIG. 3 is a flow diagram illustrating a method of training and using a neural network to determine, for each of a plurality of client information handling systems of an enterprise system, a carbon dioxide ($CO_2$) load-balancing noise threshold value for triggering execution of processor request load-balancing to minimize $CO_2$ emissions according to an embodiment of the present disclosure. As described herein, the noise and CO2 emissions minimizing load balancing system in an embodiment may train a neural network to model a relationship between power consumption, geographic location, processor request load, noise measurements, ambient temperature and humidity at the geographic location, and determined CO2 emissions values for any given client information handling system (e.g., server) within an enterprise system (e.g., across one or more servers, racks, rooms, farms). Noise generated by such client information handling systems may peak during periods of highest power consumption (e.g., power consumed by the processor executing high load of requests, or power consumed by the fan at high internal or ambient temperature or humidity). Other causes for an increase in measured noise levels may include an increased number of fans actively engaged, or an increase in the speed at which such fans rotate. Still other causes for such an increase in measured noise levels may also include an increase in ambient noise at a data center due to other client nearby client information handling systems engaging their fans to decrease heat generated at those devices or facility cooling systems engaging at a data center facility. Thus, the noise and CO2 emissions minimizing load balancing system may use recorded noise as a proxy for determining when to initiate load-balancing redistribution of calls currently routed to a client information handling system experiencing high call load and high power consumption causing increased CO2 emissions.

At block 302, the noise and CO2 emissions minimizing load balancing system in an embodiment may receive training period JSON incidents including power consumption analytics, measured noise level, geographic locations, load of processing requests received from remote devices, determined CO2 emissions value, and ambient temperature and humidity for that geographic location. Such training period JSON incidents may be received periodically from a plurality of client information handling systems or a remote database of ambient temperature and humidity for various locations. For example, in an embodiment described with respect to FIG. 2, client device operational telemetry measurements including power analytics, geographic location, ambient temperature or humidity for that geographic location (e.g., as retrieved from a weather database), as well as determined CO2 emissions values particular to each client information handling system (e.g., 250, 270, or 273) may be gathered during routine monitoring periods from a plurality of client information handling systems (e.g., 250, 270, or 273) at the UEM platform 200 executing the noise and CO2 emissions minimizing load-balancing system 280.

The data collector 261 may routinely collect information from the power analytics module 240 at preset intervals and transmit information received at any given time from the power analytics module 240 and reformatted to a predetermined data interchange format (e.g., JSON) to the load-balancing agent 290. Each JSON incident may include one or more JSON events, each including any information gathered from the power analytics module 240 and a time stamp associated with either the time the analytics module report was generated, current configurations or policies for various hardware components (e.g., 220, 242, 243, 244, 246, 247, 248, or 249), power consumption of those components over a known monitoring time period, geographic location, or ambient temperature or humidity for that geographic location, for example. In some cases, the ambient temperature or humidity for that geographic location may be drawn from a database recording such values for a plurality of geographic locations around the world.

Such JSON incidents may further include a CO2 emissions value determined for the monitoring period in which each of these operational telemetry measurements were recorded within the JSON incident. The load-balancing module 290 in an embodiment may make such a determination based on power consumed during the monitoring period, length of the monitoring period, and pounds of CO2 emitted per kWh of power generated at the power plant providing power to the client information handling system (e.g., 250). As described herein, CO2 emitted by any given client information handling system (e.g., 250) may be dependent upon power consumed during operation of the client information handling system (e.g., 250), and geographic location (e.g., India) of the client information handling system (e.g., 250). The amount of CO2 emitted during production of each kilowatt-hour (kWh) of power may vary greatly across different geographic regions. The CO2 optimization engine 285 in an embodiment may transmit location-specific CO2 emissions per kWh consumed for the geographic location of the client information handling system (e.g., 250) to the client information handling systems (e.g., 250), based on the geographic location for the client information handling system 250. The load-balancing agent 290 in an embodiment may multiply these received location-specific CO2 emissions (e.g., CO2 pounds per kWh) by the power consumed over a set period of time to determine a CO2 emissions value for each JSON incident generated by each client information handling system. The load-balancing agent 290 may further include such determined CO2 emissions values within each JSON incident prior to transmission of the JSON incidents to the communication agent 281. The load-balancing agent 290 in an embodiment may then transmit the JSON incident to the communication agent 281 of the CO2 emissions minimizing load-balancing system 280.

In some embodiments, the load-balancing agent 290 may perform such a determination of CO2 emissions values during a training period in order to model a relationship between monitored noise levels at the client information handling system, the number of remote processor calls processed, and the CO2 emissions values for that client information handling system. Following such a training period, the neural network trained during that period may then operate to determine the CO2 emissions values based on the noise level measured at the client information handling system (e.g., 250) and on measured load of processor calls received from remote information handling systems. The trained neural network may also operate to determine a processor call load the client information handling system likely could process while the client information handling system measures any given noise level (e.g., input any given noise level into the neural network to determine an output predicted processor call load that may generate the input noise level).

Power consumption values at the client information handling system 250 in an embodiment may not provide a direct correlation to the processor call load a client information handling system 250 may be capable of handling. In some cases, increased load on the processor 242 may directly correlate to an increase in power consumption by the processor 242 itself. In other cases, as this load increases, the temperature of the processor 242 may also increase, causing additional power consumption by the fan 243. The power consumed by the processor 242 and the fan 243 in such an example may not correlate linearly to the increase in processor call load however not in all circumstances. Further, increases in the ambient temperature or humidity surrounding the client information handling system 250 or increased external temperature due to nearby client information handling systems may also cause one or more fans 243 to engage or to increase speed in order to enable the processor 242 to continue to manage the same processor call load. Thus, increased temperature or humidity (either internal or external) may cause power consumption (e.g., via one or more fans 243) to rise while processor call load remains static. Noise levels measured at the client information handling system 250 via microphone 247 in such an embodiment, alone or in combination with power consumption operational telemetry measurements, when input into the trained neural network 286, may provide a more accurate prediction of any given client information handling system's (e.g., 250) capacity to handle processor calls. This may then be correlated, based on $CO_2$ emissions levels associated with power supplied to a data center and to a client information handling system 250, to $CO_2$ emissions levels on a per client information handling system basis for a monitoring period. For example, $CO_2$ emissions per kWh for a data center power source to power each client information handling system may be used to correlate to $CO_2$ emissions values at various noise levels depending on data center and each client information handling system (e.g., 250, 270, or 273).

The $CO_2$ emissions minimizing load-balancing system in an embodiment may identify peak hours of operation for each of a plurality of client information handling systems in an embodiment at block 304. Such peak hours may be defined as hours during which a threshold percentage of all daily processing requests are received or processed in an embodiment. For example, the noise and $CO_2$ emissions minimizing load balancing system 280 in an embodiment may identify peak hours of operation for the client information handling system (e.g., 250) as the hours in which the JSON incidents received during the training period reflect the remote processing request load on the processor 242 during any given hour of a 24-hour period reaching a peak hour threshold percentage of total remote processing request load for that 24-hour period. More specifically, the noise and $CO_2$ emissions minimizing load balancing system 280 in an embodiment may identify each hour within a given 24-hour period in which the remote processing request load on the processor 242 met or exceeded 10% of the total remote processing request load received for that 24-hour period as a peak hour.

At block 306, the $CO_2$ emissions minimizing load-balancing system in an embodiment may train a neural network to model a relationship between recorded noise levels, power consumed, request load, temperature, humidity, and $CO_2$ emissions values per client information handling system as recorded in training period JSON incidents generated during peak hours. For example, neural network 286 may be trained using crowd-sourced data from a plurality of client information handling systems (e.g., 250, 270, and 273) to model a relationship between changes in $CO_2$ emissions values and changes in client device operational telemetry measurements including power analytics, noise measurements, a load of remote processing calls made to a hardware processor, geographic location, ambient temperature or humidity for that geographic location (e.g., as retrieved from a weather database), as well as determined $CO_2$ emissions values particular to each client information handling systems (e.g., 250, 270, or 273). As described in greater detail below, the noise and $CO_2$ emissions minimizing load-balancing system 280 may train the neural network to predict a correlation between measured noise at each client information handling system (e.g., 250, 270, or 273) and a maximum allowable $CO_2$ threshold value to provide a $CO_2$ load-balancing noise threshold value at which a load-balancing method may be triggered at each client information handling system (e.g., 250, 270, or 273), based on inputs from operational telemetry measurements and fixed inputs, e.g., ($CO_2$ emissions per kWh for a data center power source to power each client information handling system, as described above), to minimize or decrease $CO_2$ emissions. In some embodiments, the neural network 286 may be trained using operational telemetry measurements across all client information handling systems (e.g., 250, 270, and 273) managed by the enterprise system 235. In other embodiments, a plurality of neural networks may be trained using crowd-sourced operational telemetry measurements gathered from client information handling systems of the same model or age.

The $CO_2$ emissions minimizing load-balancing system in an embodiment may determine a per machine peak hour average $CO_2$ emissions value for each of the client information handling systems at block 308. For example, the noise and $CO_2$ emissions minimizing load balancing system 280 in an embodiment may refer to training period JSON incidents to determine the $CO_2$ emissions values recorded during peak hours (e.g., as identified at block 304 above) for each client information handling system (e.g., 250, 270, or 273). As described herein, the neural network may be trained to determine $CO_2$ emitted by any given client information handling system (e.g., 250) which may be dependent upon power consumed during operation of the client information handling system (e.g., 250), and geographic location (e.g., India) of the client information handling system (e.g., 250). The amount of $CO_2$ emitted during production of each kilowatt-hour (kWh) of power may vary greatly across different geographic regions. The $CO_2$ optimization engine 285 in an embodiment may transmit location-specific $CO_2$ emissions per kWh consumed for the geographic location of the client information handling system (e.g., 250) to the client information handling systems (e.g., 250). The load-balancing agent 290 in an embodiment may apply these received location-specific $CO_2$ emissions per kWh by the power consumed over a set period of time from various data center factors and client information handling system operations to determine a $CO_2$ emissions value for each JSON incident generated by each client information handling system. The load-balancing agent 290 may further include such determined $CO_2$ emissions values within each JSON incident prior to transmission of the JSON incidents to the communication agent 281. Because each training period JSON incident may be timestamped, the noise and $CO_2$ emissions minimizing load balancing system 280 may refer to such training period JSON incidents that include timestamps within the peak hours identified at block 304 above to determine $CO_2$ emissions values for a given client information handling system during those peak hours. The noise and $CO_2$ emissions minimizing load balancing system 280 in such an embodiment may then take an average of each of these $CO_2$ emissions values for a given client information handling system over each of these peak hours within the training period to determine a per-machine peak hour average $CO_2$ emissions value that is specific to that client information handling system (e.g., 250).

Because the training period may occur immediately after initial use of the client information handling system (e.g., 250), and because power consumption efficiency may decrease as each client information handling system (e.g., 250) ages, the $CO_2$ emitted during peak hours of the training period may indicate the $CO_2$ emitted while each client information handling system is operating at peak efficiency with respect to its life cycle. As these client information handling systems (e.g., 250) age and consume a greater amount of power to perform the same number of processing calls, it may become appropriate to offload some of these processing calls to other, more power-efficient client information handling systems (e.g., 270, or 273) in other data centers. In other aspects, some client information handling systems may experience decreased power-efficiency due to ambient temperature or humidity, rather than age. For example, as the ambient temperature or humidity surrounding a client information handling system (e.g., 250) increases, the cooling system (e.g., fan 243) may consume greater amounts of power to keep the processor 242 operating efficiently and effectively. Depending on CO2 per kW at that location, a peak hour average CO2 emissions value may be determined for each client information handling system. In such a scenario, it may also be appropriate to offload some processing calls made to the processor 242 of client information handling system 250 to other, more power-efficient client information handling systems (e.g., 270, or 273), which may be operating in cooler climates or use cleaner energy sources (e.g., from power plants producing less CO2 per kWh generated). As a consequence, this average amount of CO2 emitted during peak hours of a training period may be used as a target maximum CO2 emissions value for future operation of each client information handling system in one example embodiment. In other embodiments, as described below with respect to block 310, an average amount of CO2 emitted during peak hours across all of the client information handling systems within an enterprise system may provide such a target maximum CO2 emissions value.

At block 310, the noise and CO2 emissions minimizing load balancing system in an embodiment may optionally determine an enterprise-wide peak hour average CO2 emissions value across all the client information handling systems managed by a single enterprise management system. For example, the noise and CO2 emissions minimizing load balancing system in an embodiment may perform the same method described above with respect to client information handling system 250 at block 308, with respect to client information handling system 270 and other client information handling systems 273. The noise and CO2 emissions minimizing load balancing system in such an embodiment may then take the average of the per-machine peak hour average CO2 emissions values for the first client information handling system 250, the second client information handling system 270 and other client information handling systems 273 to determine an enterprise-wide peak hour average CO2 emissions value. Each average per-machine peak hour CO2 emissions value is location dependent on local CO2 emitted per kWh of power generated there. As described herein, this enterprise-wide peak hour average CO2 emissions value may then be used as a target maximum CO2 emissions value for future operation of each client information handling system in one example embodiment, but noise levels reaching that level may vary at different center locations.

The noise and CO2 emissions minimizing load balancing system in an embodiment at block 312 may train, for each client information handling system, a CO2 load-balancing noise threshold value depending on input factors including local CO2 per kWh levels of power at a data center location. Such a threshold value may be the noise level that the neural network predicts may be emitted by each of the client information handling systems when operating so as to cause CO2 emissions at the enterprise-wide or per-machine peak hour average CO2 emissions value. As described herein, the noise emitted by each client information handling system (e.g., 250, 270, or 273) in an embodiment may serve as a proxy indicator of the power being consumed by each client information handling system, and thus, the CO2 emitted during operation. This may be the case, for example, because the temperature of the processor 242 may increase as the load of remote processing calls to that processor 242 increases, thus triggering the fan 243 to engage and generate noise. Other causes for an increase in measured noise levels may include an increased number of fans actively engaged, or an increase in the speed at which such fans rotate. Still other causes for such an increase in measured noise levels may also include an increase in ambient noise at a data center due to other client nearby client information handling systems engaging their fans to decrease heat generated at those devices or due to data center facility cooling systems. This may also be the case, for example, when the fan 243 is engaged to offset an increase in ambient temperature or humidity in order to preserve efficiency and effectiveness of the processor 242. In each of these cases, the power consumed by the client information handling system 250 may increase due to use of the fan 243 or fans to cool the processor 242 or other client information handling system servers nearby in a data center. Thus, noise generated by the fan 243 in an embodiment may correlate to increases in power consumption at the client information handling system 250, depending on input factors including local CO2 per kWh levels of power at a data center location.

The neural network trained at block 306 may predict a CO2 load-balancing noise threshold value for a noise level that a client information handling system 250 may emit when also emitting the maximum CO2 emissions value. In such a way, the noise and CO2 emissions minimizing load balancing system may define a noise level each client information handling system (e.g., 250) may emit at which it may become appropriate to offload some processing calls made to the processor 242 to other, more power-efficient client information handling systems (e.g., 270, or 273), which may be operating in cooler climates or at data center location with lower CO2 emitting power sources. The method for training and using a neural network to determine a carbon dioxide (CO2) load-balancing noise threshold value for triggering execution of processor request load-balancing to minimize CO2 emissions may then end.

Figure 4:
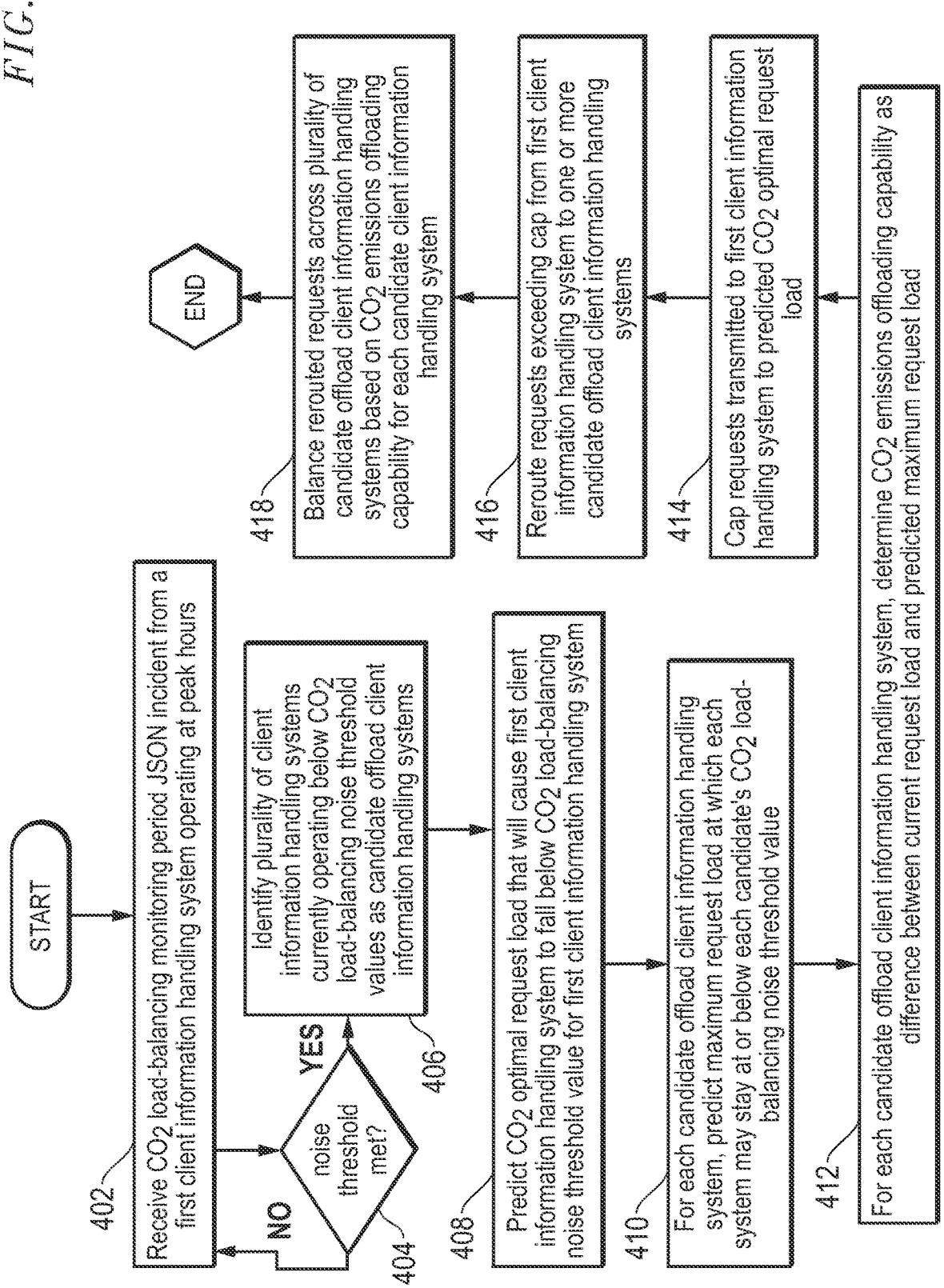
FIG. 4 is a flow diagram illustrating a method of load balancing processor requests across client information handling systems to minimize $CO_2$ emissions based on detected noise levels at a client information handling system according to an embodiment of the present disclosure.

FIG. 4 is a flow diagram illustrating a method of load balancing processor requests across a plurality of client information handling systems to minimize carbon dioxide (CO2) emissions of an enterprise system according to an embodiment of the present disclosure. Following the training period described above with respect to FIG. 3, each client information handling system in an embodiment may then enter routine load-balancing monitoring intervals in which the noise and CO2 emissions minimizing load balancing system monitors noise levels and other telemetry from the client information handling systems to determine when processor request calls may be redistributed using load-balancing techniques to minimize CO2 emissions across the enterprise system.

At block 402, the noise and CO2 emissions minimizing load balancing system in an embodiment may receive CO2 load-balancing monitoring period JSON incidents from a first client information handling system operating at peak hours. For example, in an embodiment described with reference to FIG. 2, JSON incidents may continue to be generated at the client information handling system 250 and transmitted to the noise and CO2 emissions minimizing load balancing system 280 operating at the UEM platform 200. The load balancing agent (e.g., 290 or 271) operating at each client information handling system (e.g., 250, 270, or 273) may generate and transmit to the UEM platform 200 such monitoring JSON incidents to include some or all previously described operational telemetry measurements (e.g., power analytics and consumption, geographic location, remote processing request load, noise measurements, ambient temperature or humidity for the recorded geographic location, and determined $CO_2$ emissions values as described above with respect to FIG. 3 at block 302) to input into a trained neural network 286 to determine if the $CO_2$ load-balancing noise threshold value determined for each specific client information handling system (e.g., 250, 270, or 273) has been met.

The noise and $CO_2$ emissions minimizing load balancing system in an embodiment may determine at block 404 whether the $CO_2$ load-balancing noise threshold value for the specific client information handling system has been met. For example, the noise and $CO_2$ emissions minimizing load balancing system 280 may refer to a $CO_2$ load-balancing monitoring period JSON incident received from client information handling system 250 to determine whether the noise measured (e.g., in dB) via the microphone 247 meets or exceeds the $CO_2$ load-balancing noise threshold value determined for that client information handling system 250 (e.g., as described above with respect to block 312 of FIG. 3) based on the level of $CO_2$ per kWh of power supplied at its local data center among other factors such as temperature or humidity. As described herein, the noise emitted by each client information handling system (e.g., 250, 270, or 273) in an embodiment may serve as a proxy indicator of the power being consumed by each client information handling system, and thus, the $CO_2$ emitted during operation. If the noise measured via the microphone meets or exceeds the $CO_2$ load-balancing noise threshold value for a given client information handling system, this may indicate a need to decrease $CO_2$ emitted by that client information handling system. The method may then proceed to block 406 for initiation of a load-balancing method to cap processing requests at that client information handling system and redistribute or reroute processing requests exceeding that cap to other client information handling systems currently emitting less $CO_2$. If the noise measured via the microphone does not meet or exceed the $CO_2$ load-balancing noise threshold value for a given client information handling system, this may indicate no current need for such a request redistribution or capping, and the method may then proceed back to block 402 for routine monitoring of the client information handling system.

At block 406, in an embodiment in which a monitoring period JSON incident includes a noise measurement identified by the noise and $CO_2$ emissions minimizing load balancing system 280 as meeting the $CO_2$ load-balancing noise threshold value for that client information handling system 250, the noise and $CO_2$ emissions minimizing load balancing system may identify a plurality of client information handling systems currently operating below the $CO_2$ load-balancing noise threshold values specific to those systems as candidate offload client information handling systems, as determined by input into the trained neural network 286 for those other client information handling systems. For example, the load-balancing module 283 may identify one or more other client information handling systems (e.g., 270, or 273) also managed by the enterprise management system 235 as candidates to receive a portion of the remote processing calls currently being routed to the first client information handling system 250, based on one or more of a plurality of $CO_2$-sensitive factors and telemetry including noise levels, temperature and humidity levels, and $CO_2$ per kWh for an energy source for those client information handling systems (e.g., 270 or 273) among others input into a trained neural network 286. More specifically, candidate offload client information handling systems (e.g., 270, or 273) may include client information handling systems currently operating outside peak hours of operation, or at measured noise levels below the $CO_2$ load-balancing noise threshold value individually identified or determined for that specific client information handling system (e.g., 270, or 273) via the noise and $CO_2$ emissions minimizing load-balancing system trained neural network 286.

The noise and $CO_2$ emissions minimizing load balancing system trained neural network 286 in an embodiment at block 408 may predict a $CO_2$ optimal request load that will cause the first client information handling system to fall below the $CO_2$ load-balancing noise threshold value for the first client information handling system. The load-balancing module 283 may operate to determine an optimal method for redistributing a portion of the remote processing calls currently routed to the first client information handling system 250 across one or more of the candidate offload client information handling systems (e.g., including 270 or 273). In order to do so, the noise and $CO_2$ emissions minimizing load balancing system 280 may first determine the volume or load of processing requests that may need to be diverted or rerouted from the first client information handling system 250 based on output from the neural network 286 in order to ensure the first client information handling system 250 emits $CO_2$ below the peak hour average $CO_2$ emissions value (e.g., either per-machine or enterprise-wide). For example, the noise and $CO_2$ emissions minimizing load balancing system 380 in an embodiment may use the trained neural network 286 to determine a $CO_2$ optimal request load that may cause the first client information handling system 250 to generate noise falling below the $CO_2$ load-balancing noise threshold value determined for the first client information handling system 250, as described in greater detail above with respect to FIG. 3 at block 312. This may provide a target maximum processing request load that may be accepted by the client information handling system 250 to allow the client information handling system 250 to emit $CO_2$ below the peak hour average $CO_2$ emissions value correlated to the $CO_2$ load-balancing noise threshold value for that client information handling system 250.

At block 410, the noise and $CO_2$ emissions minimizing load balancing system and its trained neural network agent in an embodiment may predict, for each candidate offload client information handling system, a maximum request load each candidate may accept while staying below their respective $CO_2$ load-balancing noise threshold values. In other words, the noise and $CO_2$ emissions minimizing load balancing system 280 and its trained neural network agent in an embodiment may determine the volume or load of processing calls it may reroute from the first client information handling system 250 to any given candidate offload client information handling system (e.g., 270, or 273) before causing the candidate offload client information handling system 270 to emit $CO_2$ above its machine-specific peak hour average $CO_2$ emissions value. Upon identification of all candidate offload client information handling systems (e.g., including 270), the load-balancing module 283 may use the trained neural network 286 to determine, for each candidate offload client information handling system, a $CO_2$ optimal request load that would cause the system to generate noise falling below the CO2 load-balancing noise threshold value individually determined for that specific client information handling system (e.g., including 270).

The noise and CO2 emissions minimizing load balancing system in an embodiment at block 412 may determine, for each candidate offload client information handling system identified at block 406, a CO2 emissions offloading capability. Such an offloading capability may be defined in an embodiment as a difference between the current request load at each candidate offload client information handling system and the predicted maximum request load determined for that candidate offload client information handling system at block 410, above. For example, a CO2 emissions offload capability may be determined for each of the candidate offload client information handling systems (e.g., including 270) by determining the difference between the CO2 optimal request load (e.g., as described above with respect to block 410) and the current remote processing request load for that candidate offload client information handling system (e.g., 270, or 273) as recorded within the most recently received JSON incident from that candidate offload client information handling system (e.g., 270, or 273). Based on this CO2 emissions offload capability determined for each of the candidate offload client information handling systems (e.g., including 270) in an embodiment, the load-balancing module 283 may determine a percentage of the current remote processing request load for the first client information handling system 250 that can be rerouted to each of the candidate offload client information handling systems to stay under a CO2 load-balancing noise threshold value that would cause the candidate offload client information handling system (e.g., 270, or 273) to emit CO2 above its machine-specific peak hour average CO2 emissions value.

At block 414, the noise and CO2 emissions minimizing load balancing system may cap the number of requests accepted by or transmitted to the first client information handling system at the predicted CO2 optimal request load determined for the first client information handling system at block 408. For example, the load-balancing module 283 may transmit a capping instruction to the load-balancing agent 290 to cap the number of remote processing calls to the processor 242 at the remote processing call load identified within JSON incident received immediately prior to the most recently received JSON incident. The load-balancing agent 290 in such an embodiment may work in tandem with the power analytics module 240 to cap the resources for the processor 242 for the first client information handling system 250 that may available pursuant to execution of such received remote processor calls. In such a way, the load-balancing agent 290 and power analytics module 240 may limit the number of remote calls to the processor 242 to a number of calls recorded just prior to the microphone 247 detecting and recording within the most recent JSON incident ambient noise exceeding the CO2 load-balancing noise threshold value.

The noise and CO2 emissions minimizing load balancing system in an embodiment at block 416 may reroute requests exceeding the cap for the first client information handling system to one or more candidate offload client information handling systems determined above. For example, the load-balancing module 283 may orchestrate rerouting or redistribution of any processing requests rejected by the first client information handling system 250 pursuant to such capping instructions at the first client information handling system 250 to limit and reduce overall CO2 emissions across plural data centers. The load-balancing module 283 in such an embodiment may balance the surplus processor requests rejected from the first client information handling system 250 across one or more of the candidate offload client information handling systems (e.g., including 270) so as to further minimize CO2 emissions across the enterprise system.

The load-balancing module 283 may follow any currently known or future developed methods of load-balancing, as informed by the determined CO2 emissions values for each of the candidate offload client information handling systems (e.g., including 270) to perform such a process in an embodiment. For example, the noise and CO2 emissions minimizing load balancing system 280 and load-balancing module 283 in an embodiment may prioritize redistribution of rejected processing requests (up to the determined CO2 emissions offload capability for that candidate) to candidate offload client information handling systems (e.g., including 270) predicted by the trained neural network 286 to emit less CO2 during processing of such requests. More specifically, such rejected requests may be redistributed to prioritize client information handling systems (e.g., 270, or 273) currently operating in off-peak hours, or currently emitting lowest noise levels measured across all candidate offload client information handling systems (e.g., indicating slower fan speed, fewer fans activated, less activity at the data center, and lower processor temperature and power consumption). In another example, such rejected requests may be redistributed to prioritize client information handling systems (e.g., 270, or 273) located in a geographic region that emits less CO2 per kWh of power generated than that of the geographic location for the first client information handling system or other candidate offload client information handling systems. In yet another example, such rejected requests may be redistributed to prioritize client information handling systems (e.g., 270, or 273) currently operating at geographic locations associated with lowest temperature or humidity measured across all candidate offload client information handling systems. In still another example, such rejected requests may be redistributed to prioritize client information handling systems (e.g., 270, or 273) based on their respective CO2 emissions offloading capabilities (e.g., moving from the client information handling system associated with a highest CO2 emissions offloading capability to the client information handling system associated with a lower CO2 emissions offloading capability. In such a way, the noise and CO2 emissions minimizing load balancing system optimally distribute processing requests automatically across a plurality of client information handling systems located at various places around the planet so as to minimize CO2 emissions across plural data centers available to an enterprise. The method for load balancing processor requests across a plurality of client information handling systems to minimize CO2 emissions of an enterprise system may then end.

The blocks of the flow diagrams of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A noise and carbon dioxide ($CO_2$) emissions minimizing load-balancing system executing on a unified endpoint management (UEM) platform information handling system comprising:
   a network interface device to receive operational telemetry measurements for a first client information handling system operating within determined peak hours, including power analytics, including a load of remote processing calls made to a hardware processor, a geographic location, ambient temperature, ambient humidity, a determined $CO_2$ emissions value, and a measured noise level;
   the hardware processor executing code instructions of the noise and $CO_2$ emissions minimizing load-balancing system to determine when the measured noise level exceeds a first $CO_2$ load-balancing noise threshold value determined for the first client information handling system;
   the hardware processor executing code instructions of the noise and $CO_2$ emissions minimizing load-balancing system to reject remote processing call requests made to the first client information handling system above a $CO_2$ optimal request load determined for the first client information handling system that is predicted, via a crowd-source trained neural network modeling a relationship between changes in $CO_2$ emissions values and changes in the operational telemetry measurements, to cause the first client information handling system to emit a noise level falling below the first $CO_2$ load-balancing noise threshold value; and
   the hardware processor to redistribute the rejected remote processing call requests across a plurality of candidate offload client information handling systems currently emitting noise below a candidate-specific $CO_2$ load-balancing noise threshold value determined for each of the plurality of candidate offload client information handling systems.

2. The information handling system of claim 1, wherein the determined $CO_2$ emissions value is determined at the first client information handling system based on physical location of the first client information handling system indicating $CO_2$ used in generating power for the first client information handling system.

3. The information handling system of claim 1, wherein the peak hours determined for the first client information handling system identifies one or more hours within a 24-hour monitoring period in which the first client information handling system receives an hourly processing request load meeting a threshold percentage of daily remote processing call requests received over a 24-hour period.

4. The information handling system of claim 1, wherein at least a portion of the plurality of candidate offload client information handling systems are each operating at off-peak hours.

5. The information handling system of claim 1 further comprising:
   the hardware processor to determine an average of the $CO_2$ emissions values recorded for the first client information handling system over a training period based in part on the location of the first client information handling system; and
   the hardware processor to determine the $CO_2$ load-balancing noise threshold value predicted by the crowd-source trained neural network to occur when the first client information handling system is emitting the average of the $CO_2$ emissions values during a monitoring period following the training period.

6. The information handling system of claim 1 further comprising:
   the hardware processor to determine an enterprise-wide average of $CO_2$ emissions values determined for each of a plurality of enterprise client information handling systems including the first client information handling system and the plurality of candidate offload client information handling systems over a training period; and
   the hardware processor to determine the $CO_2$ load-balancing noise threshold value predicted by the crowd-source trained neural network to occur when the first client information handling system is emitting the enterprise-wide average of the $CO_2$ emissions values during a monitoring period following the training period.

7. The information handling system of claim 1 further comprising:
   the hardware processor to cap a proportion of the rejected remote processing call requests redistributed to a candidate-specific maximum request load predicted for each of the plurality of candidate offload client information handling systems by the neural network to maintain respective emitted noise levels below the candidate-specific $CO_2$ load-balancing noise threshold value for each of the plurality of candidate offload client information handling systems.

8. A method of load-balancing processing requests to minimize noise and carbon dioxide ($CO_2$) emissions by a plurality of enterprise client information handling systems executing on a unified endpoint management (UEM) platform information handling system comprising:
   receiving operational telemetry measurements for a first client information handling system, via a network interface device, operating within determined peak hours, including power analytics, a load of remote processing calls made to a hardware processor, a geographic location, ambient temperature, ambient humidity, a determined $CO_2$ emissions value, and a measured noise level;

determining, via the hardware processor when the measured noise level exceeds a first CO2 load-balancing noise threshold value determined for the first client information handling system;
determining, via the hardware processor, an enterprise-wide average of CO2 emissions values recorded for each of the plurality of enterprise client information handling systems including the first client information handling system and a plurality of candidate offload client information handling systems over a training period, and determining, by a trained neural network modeling a relationship between changes in CO2 emissions values and changes in the operational telemetry measurements, that the first CO2 load-balancing noise threshold value occurs when the first client information handling system is emitting a noise level that corresponds to a CO2 emissions level that is the enterprise-wide average of CO2 emissions values;
rejecting remote processing call requests made to the first client information handling system above a CO2 optimal request load determined for the first client information handling system and determined, via the trained neural network, to limit the first client information handling system to emit noise levels below the first CO2 load-balancing noise threshold value; and
redistributing rejected remote processing call requests across the plurality of candidate offload client information handling systems.

9. The method of claim 8 further comprising:
redistributing rejected remote processing call requests across the plurality of candidate offload client information handling systems currently emitting noise below a candidate-specific CO2 load-balancing noise threshold value determined for each of the plurality of candidate offload client information handling systems.

10. The method of claim 8, wherein the trained neural network is trained based on crowd-sourced operational telemetry measurements received from a subset of the plurality of enterprise client information handling systems having the same model number.

11. The method of claim 8, wherein the determined CO2 emissions value is determined at the first client information handling system based on physical location of the first client information handling system indicating CO2 used in generating power for the first client information handling system.

12. The method of claim 8, wherein the peak hours determined for the first client information handling system are identified as one or more hours within a 24-hour monitoring period in which the first client information handling system receives an hourly processing request load meeting a threshold percentage of daily remote processing call requests received over a 24-hour period.

13. The method of claim 8, wherein the plurality of candidate offload client information handling systems are each operating at off-peak hours.

14. The method of claim 8 further comprising:
capping, via the hardware processor, a proportion of the rejected remote processing call requests redistributed to each of the plurality of candidate offload client information handling systems to a candidate-specific maximum request load predicted by the trained neural network to limit emitted noise levels to the candidate-specific CO2 load-balancing noise threshold value for each of the respective plurality of candidate offload client information handling systems.

15. A noise and carbon dioxide (CO2) emissions minimizing load-balancing system executing on a unified endpoint management (UEM) platform information handling system comprising:
a network interface device to receive operational telemetry measurements for a first client information handling system operating within determined peak hours, including power analytics, a load of remote processing calls made to a hardware processor, a geographic location, ambient temperature, ambient humidity, a determined CO2 emissions value, and a measured noise level exceeding a first CO2 load-balancing noise threshold value determined for the first client information handling system;
the hardware processor to determine a first client average of the determined CO2 emissions values recorded for the first client information handling system over a training period and correlate detected noise levels to determine the first client CO2 load-balancing noise threshold value via a trained neural network modeling a relationship between changes in CO2 emissions values and changes in the operational telemetry measurements to occur when the first client information handling system is emitting the first client average of CO2 emissions values;
a hardware processor executing code instructions of the noise and CO2 emissions minimizing load-balancing system to reject remote processing call requests made to the first client information handling system above a CO2 optimal request load determined for the first client information handling system via a crowd-source trained neural network modeling a relationship between changes in CO2 emissions values and changes in the operational telemetry measurements, to limit the first client information handling system to emit a noise level below the first CO2 load-balancing noise threshold value; and
the hardware processor to redistribute rejected remote processing call requests across a plurality of candidate offload client information handling systems.

16. The information handling system of claim 15 further comprising:
the hardware processor to redistribute rejected remote processing call requests across the plurality of candidate offload client information handling systems currently emitting noise below a candidate-specific CO2 load-balancing noise threshold value determined for each of the plurality of candidate offload client information handling systems.

17. The information handling system of claim 15 further comprising:
the hardware processor to prioritize redistribution of rejected remote processing call requests across a subset of the plurality of candidate offload client information handling systems in candidate geographic locations where less CO2 is emitted per kilo-watt-hour (kWH) of power generated than the geographic location for the first client information handling system.

18. The information handling system of claim 15 further comprising:
the hardware processor to prioritize redistribution of rejected remote processing call requests across a subset of the plurality of candidate offload client information handling systems based on noise level measurements at each of the candidate offload client information handling systems below a candidate-specific CO2 load-balancing noise threshold value determined for each of the plurality of candidate offload client information handling systems.

19. The information handling system of claim 15 further comprising:
the hardware processor to prioritize redistribution of rejected remote processing call requests across a subset of the plurality of candidate offload client information handling systems currently operating at off-peak-hours.

20. The information handling system of claim 15 further comprising:
the hardware processor to prioritize redistribution of rejected remote processing call requests based on a highest to lowest candidate-specific maximum request load predicted for each of the plurality of candidate offload client information handling systems to limit emitted noise levels below the candidate-specific $CO_2$ load-balancing noise threshold value for each of the respective plurality of candidate offload client information handling systems.

* * * * *